Figure 1:
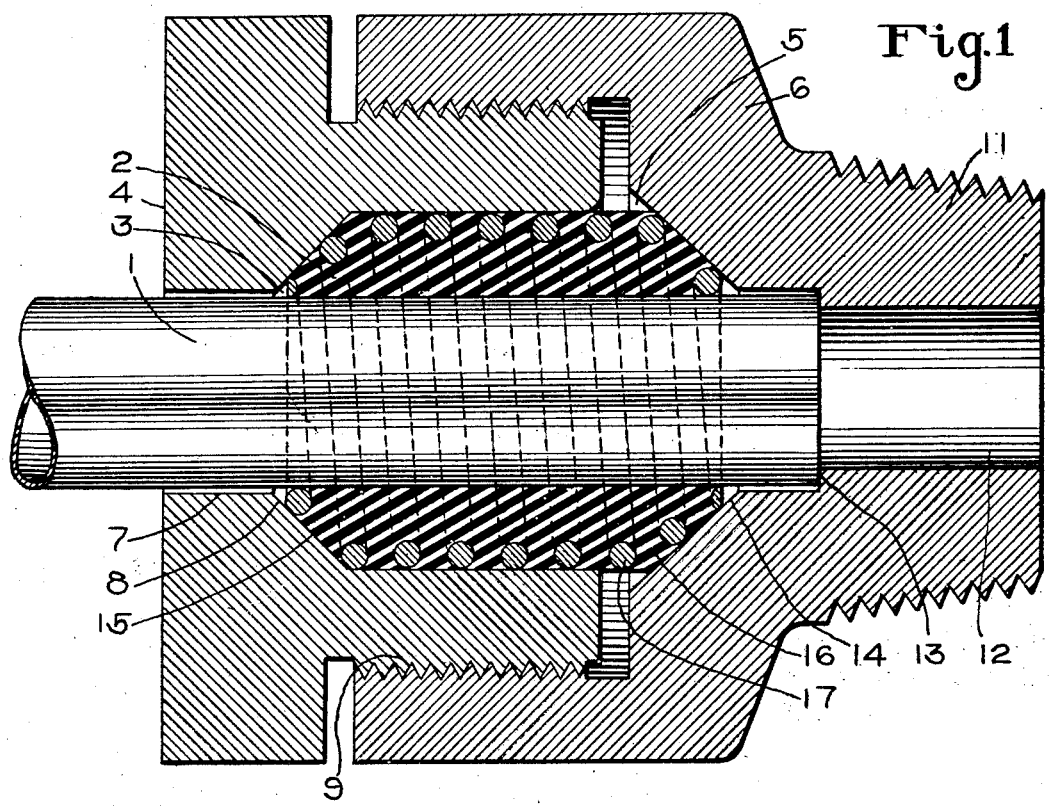

Sept. 18, 1945.　　　G. K. NEWELL　　　2,385,156
PIPE COUPLING
Filed Nov. 2, 1943

INVENTOR
George K. Newell
BY
ATTORNEY

Patented Sept. 18, 1945

2,385,156

UNITED STATES PATENT OFFICE 2,385,156

PIPE COUPLING

George K. Newell, near Pitcairn, Pa., assignor to The Westinghouse Air Brake Company, Wilmerding, Pa., a corporation of Pennsylvania Application November 2, 1943, Serial No. 508,683

4 Claims. (Cl. 285—166)

This invention relates to improvements in a fluid-tight coupling for smooth pipe and more particularly to the type employing a yieldable packing. This type of coupling is characterized by the use of a receptacle arranged to receive a smooth-walled pipe surrounded by an annular packing carried in a sleeve which cooperates with the receptacle, usually by screw-threaded engagement, to compress the packing in a direction longitudinal of the pipe.

A serious objection to couplings of this type, particularly those of simple design, is that the pipe is liable to be distorted at or near its end when a fluid-tight connection is effected. In designs where a cone-shaped portion is employed to insure a tight seal, the end of the pipe may be flared by tightening the coupling so that, when the coupling elements are unscrewed to disassemble or open the coupling, it will be impossible to remove the coupling element carried by the pipe without straightening the flared end of the pipe or otherwise injuring either the pipe or the coupling elements so much that it is difficult to again obtain a fluid-tight coupling upon reassembling.

In pipe couplings of the type comprising expansible packing made of rubber or other relatively soft material, it has been observed that where the packing is forced into tight engagement with a metal surface and is moved along this surface when the coupling is being tightened, small particles of the packing are rolled up or torn away and as a consequence, excessive compressive force is liable to be exerted on the packing in order to obtain a fluid tight seal and when this occurs that portion of the pipe which is engaged by the packing is in danger of being distorted inwardly, as a result of the radial force exerted by the packing. As a consequence the flow capacity at this point may be seriously reduced below that of the rest of the pipe. In addition, the pipe at this point may be caused to assume a permanent set having a smaller diameter than the rest of the pipe. This set may necessitate more screwing up and frequent tightenings to maintain a fluid-tight connection until finally such a connection can no longer be effected.

Another fault is found in installations where the pipe is subjected to sustained vibrations. With the pipe held rigidly in the coupling, a bending moment develops about a particular point in the pipe near the coupling. The repeated bending at this one particular point finally causes the pipe to break at this point.

These faults have been aggravated in recent times because of the prevalent use of thinner-walled metallic pipes and pipes formed of relatively softer plastic materials than heretofore, most of which are more easily distorted or broken.

An object of this invention is therefore, to effect a fluid-tight coupling with very little compression force.

An object of the invention is to provide a novel pipe coupling of the type having packing made of rubber or other relatively soft material which will be free of the above objectionable features and which will effect a fluid tight joint without having to increase the compressive force of the packing sufficiently to damage the pipe or pipes connected.

Another object is to provide a flexible pipe coupling which permits a limited amount of pipe movement in a radial direction and which will tend to suppress periodic pipe vibrations and the localizing of bending moments to a point in the pipe near the coupling.

Still another object is to provide a pipe coupling of such a simple design as can be economically manufactured.

To attain these objects the improved coupling employs a packing in the form of a tube of a pliable and resilient material such as rubber or the like and having imbedded therein and bonded thereto a helical metallic bearing member, the coils of which are contiguous to the outer surface of the packing. Thus the durability and stiffness of metal is combined with the resiliency of rubber to obtain a long-wearing, leak free and easy-sealing pipe coupling.

Figure 2:
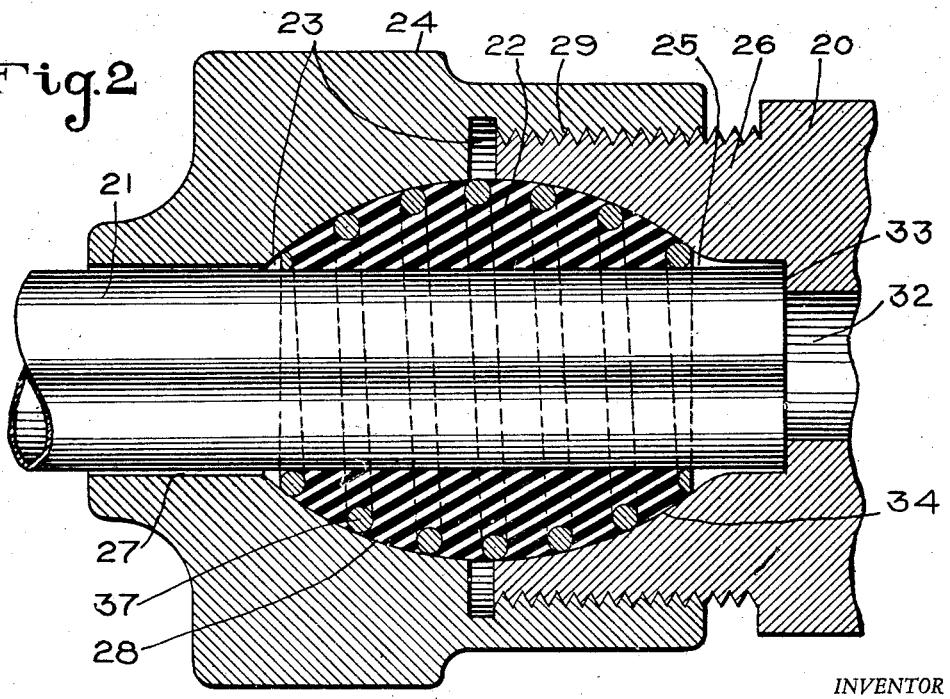

In the accompanying drawing, Fig. 1 illustrates a longitudinal sectional view of one embodiment of the invention and Fig. 2 illustrates a similar view of another embodiment.

In Fig. 1, there is illustrated one form of the improved coupling for connecting a smooth-walled pipe to a body which is arranged to receive the externally screw-threaded end of a pipe formed of metal such as iron. Around the end portion of a pipe designated by the reference numeral 1 there is mounted a packing 2 carried in a recess 3 formed in a sleeve member 4, which sleeve member 4 encircles the packing and the pipe and extends into the recess 5 of a receptacle 6, and which, within the recess 5, has screw-threaded engagement with the receptacle.

The sleeve member 4 is provided, at the left-hand end, as viewed in Fig. 1, with a centrally located axial bore 7 which opens into the recess 3. At the juncture of the bore 7 and the recess 3 there is provided an interior annular angular seat 8 sloping radially outwardly from the bore to the wall of the recess 3 for engagement with the end 15 of the packing 2.

Externally, the left-hand end of the sleeve member 4 is in the form of a nut to provide a grip for a wrench or other suitable tool. The right hand end of the outer surface of the sleeve member 4 is provided with external threads 9 for cooperative engagement with corresponding internal threads of the receptacle 6.

Externally, the left hand end portion of the receptacle 6, as illustrated in Fig. 1, is made in the form of a nut for engagement by a wrench or other suitable tool.

The right hand end of the receptacle 6 provides an externally threaded tapered projection 11 for screw-threaded connection with a member of a fixed body, not shown. A bore 12 extends longitudinally through the receptacle 6 and is open to the recess 5. A shoulder 13 which the free end of the pipe 1 may abut is provided in the bore 12 at a point to the right of the juncture of the bore with the recess 5. At this juncture the wall of the bore 12 slopes outwardly to present an interior annular angular seat 14 for engaging the right hand end 16 of the packing 2.

It should here be mentioned that the space between the outer wall of the pipe 1 and the wall of the bore 7 of the sleeve member 4 and also the space between the pipe and the wall of bore 12 to the left of shoulder 13 in receptacle 6 are greater than that ordinarily necessary to facilitate assembling. This space will permit limited radial displacement of the pipe in the coupling even after tightening, as will appear later.

The packing 2 is formed of a pliant and resilient material such as rubber to encircle the pipe 1 near its end and to fit snugly into the recess 3 of the sleeve member 4 and to extend into recess 5 of the receptacle 6 and is provided with bevelled ends 15 and 16 which engage with the corresponding bevelled seats 8 and 14 of the sleeve member 4 and the receptacle 6, respectively. The packing is in the form of a hollow cylinder with its outside diameter slightly less than that of the recess 3 and its inside diameter slightly larger than the outside diameter of the pipe 1.

The packing also comprises a helical metallic bearing member 17 which is imbedded in the rubber of the packing and which is preferably tangent to the outer periphery of the packing. The bearing member 17 is preferably wound in the direction of a left-hand screw of round metal wire such as bronze so that any twisting force to the right which may be exerted on the packing 2, as in tightening, will tend to unwind the coils of the helix thereby insuring against any bending of the coil around and binding on the pipe.

It should be pointed out that the bearing surfaces are mainly metal and hence the necessary rubbing during tightening takes place chiefly between metal surfaces so that the rubber is protected from rolling or tearing.

In assembling the coupling illustrated in Fig. 1, the sleeve member 4 and packing 2 are passed over the end of the pipe 1. The end of the pipe 1 is now manually held against the shoulder 13 while the sleeve member 4 is rotated so as to screw into the receptacle 6. The sleeve member as it is being rotated shifts the packing 2 toward the right until the end 16 thereof engages the seat 14 of the receptacle. The ends 15 and 16 are now in engagement with their respective seating surfaces 8 and 14, so that further advancement of the sleeve member 4 into the receptacle 6 causes a compression force to be exerted on the packing in a longitudinal direction. In response to this force, the rubber will flow radially inwardly against the pipe to effect a leak-free rubber seal thereon. At the same time, both the metal and the rubber will exert a force radially outwardly against the walls of the recess 3 and the seat 14 to seal tightly thereto.

Thus, it will be seen that the rubber of the packing forms the seal and the metallic member, by expanding in response to longitudinal compression of the packing as a whole, tightly engages the metal surfaces of recess 3 and seat 14. so that a tight metal to metal contact is attained to provide strength against separation. There will, however, be enough resiliency after tightening to permit limited radial movement of the pipe without detracting from the effectiveness of the coupling.

In Fig. 2 there is illustrated a modified form of the improved packing used in a different design of fitting for coupling a smooth-wall pipe to a body. Around the end portion of a pipe designated by the reference numeral 21 there is mounted a packing 22 carried in a recess 23 formed in a sleeve member 24. The packing 22 extends into a recess 25 formed in a body 20 of which only a portion is illustrated and which has screw-threaded engagement with the sleeve member 24.

The sleeve member 24 is provided, at the left-hand end as viewed in Fig. 1, with a centrally located axial bore 27 which opens into the recess 23. At the juncture of the bore 27 and the recess 23 there is provided an interior cup-shaped seat 28 flaring radially outwardly from the bore to the wall of the recess 23 for engagement with the left half of the packing 22. The right-hand end of the recess 23 is provided with internal threads 29 for cooperative engagement with corresponding external threads of the body 20.

Externally, the left-hand end of the sleeve member 24 is in the form of a nut to provide a grip for a wrench.

Externally, the left hand end 26 of the body 20, as illustrated in Fig. 2, is externally threaded for cooperative engagement with the threaded portion 29 of the sleeve member 24. A bore 32 extends longitudinally from that portion of the body 20 not shown opening into the recess 25. A shoulder 33 which the free end of the pipe 21 may abut is provided at a point to the right of the juncture of the bore 32 with the recess 25. From this juncture the wall of the recess 25 flares outwardly to form a cup-shaped seat 34 for the right-hand end of the packing 22.

The packing 22 of Fig. 2 differs from packing 2 illustrated in Fig. 1 only in the contour of the outer periphery. It is preferably formed of rubber in a tube, the outer surface of which is shaped to correspond to the cup-shaped seats 28 and 34 of the sleeve member 24 and the body 20, respectively. The packing 22 also comprises a helical metallic bearing member 37 which is imbedded in the rubber of the packing and which is preferably wound in the direction of a left-hand screw of round bronze wire to form a helix.

In assembling the coupling illustrated in Fig. 2, the sleeve member 24 and the packing 22 are passed over the end of the pipe 21. The end of the pipe 21 is held manually against the shoulder 33 while the sleeve member 24 is rotated so as to screw onto the portion 26 of the body 20. The sleeve member 24 as it is being rotated, shifts the packing 22 toward the right until the right half, approximately, of the packing engages the seat 34 in the body 26.

The longitudinal compression of the packing 22 in Fig. 2 develops radial forces in a manner similar to that of packing 2 in Fig. 1. Because of the more even distribution of the forces it is thought that this coupling would be more desirable in installations subjected to excessive vibration.

Having now described my invention, what I claim as new and desire to secure by Letters Patent, is:

1. In a coupling for a fluid conducting pipe, a receptacle for said pipe, an annular packing encircling the end portion of said pipe, a sleeve encircling said packing on said pipe and cooperating with said receptacle to exert a pressure on said packing, said packing comprising an annulus of pliant material having imbedded in the outer surface thereof metallic bearing means in the form of a left-hand helix for contact with at least the interior surface of said sleeve.

2. In a coupling for a fluid conducting pipe, a receptacle for said pipe, an annular packing encircling the end portion of said pipe, a sleeve encircling said packing on said pipe and cooperating with said receptacle to exert a pressure on said packing, said packing comprising an annulus of pliant material having imbedded in the outer surface thereof and bonded thereto a metallic bearing member in the form of a helix for contact with the interior surfaces of said receptacle and sleeve.

3. In a coupling for a fluid conducting pipe, a receptacle for said pipe, an annular packing encircling the end portion of said pipe, a sleeve encircling said packing and cooperating with said receptacle to expand said packing radially to effect a fluid-tight communication between said pipe and said receptacle, said packing comprising a helical spring for contact with the interior surfaces of said receptacle and said sleeve the main coils of which are substantially larger in diameter than is that of the pipe and the end coils of which have an inside diameter approximately the same as the outside diameter of the pipe and also comprising an annulus of pliant material disposed within said spring and in the longitudinal spaces between the coils of said spring and bonded thereto.

4. A packing for a pipe coupling, said packing being of the type which is constructed to be interposed between two coupling elements of a pipe coupling and which is expansible in response to longitudinal movement of at least one of said elements relative to the others for effecting a fluid tight seal between a pipe and said elements, and comprising an annular member of relatively soft resilient material for encircling the pipe, and bearing means imbedded in the outer surface of said soft material and made of harder material than said soft material for sliding contact with the coupling elements.

GEORGE K. NEWELL.